(12) United States Patent
Chan et al.

(10) Patent No.: US 6,792,265 B1
(45) Date of Patent: Sep. 14, 2004

(54) CONFERENCE CALL SETUP UTILIZING A WIRELESS ACCESS PROTOCOL CAPABLE TELEPHONE

(75) Inventors: Jim H. Chan, Austin, TX (US); Lalitha Suryanarayana, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 503 days.

(21) Appl. No.: 09/677,243

(22) Filed: Oct. 2, 2000

(51) Int. Cl.[7] .............................................. H04M 3/42
(52) U.S. Cl. ................... 455/416; 455/414.1; 370/260; 370/270; 370/261
(58) Field of Search .............................. 455/416, 414.1; 370/259, 260, 270, 351, 401, 463, 261, 262

(56) References Cited

U.S. PATENT DOCUMENTS

| | | | |
|---|---|---|---|
| 5,327,529 A | | 7/1994 | Fults et al. |
| 5,341,374 A | * | 8/1994 | Lewen et al. |
| 5,610,910 A | * | 3/1997 | Focsaneanu et al. |
| 5,745,116 A | | 4/1998 | Pisutha-Arnond |
| 5,761,280 A | | 6/1998 | Noonen et al. |
| 5,892,475 A | | 4/1999 | Palatsi |
| 5,914,940 A | * | 6/1999 | Fukuoka et al. ............ 455/416 |
| 5,916,302 A | * | 6/1999 | Dunn et al. |
| 5,923,736 A | | 7/1999 | Shachar |
| 6,009,338 A | | 12/1999 | Iwata et al. |
| 6,037,937 A | | 3/2000 | Beaton et al. |
| 6,038,304 A | | 3/2000 | Hart |
| 6,067,443 A | | 5/2000 | Fuller et al. |
| 6,078,581 A | | 6/2000 | Shtivelman et al. |
| 6,275,575 B1 | * | 8/2001 | Wu ............................ 455/416 |
| 6,577,877 B1 | * | 6/2003 | Charlier et al. ............. 455/557 |

OTHER PUBLICATIONS

Optical IP Networks, "Wireless Standard Threatened by GeoWorks Claim of Patent Infringement"; http://www.info-world.com/cgi–bin/deletef...les/en/xml/00/01/21/000121en-geoworks.xml, Jan. 21, 2000, 2 pages.

* cited by examiner

*Primary Examiner*—Erika Gary
*Assistant Examiner*—Huy Nguyen
(74) *Attorney, Agent, or Firm*—Brinks Hofer Gilson & Lione (57) ABSTRACT

A wireless access protocol-capable telephone provides the ability to conference call numerous individuals. While maintaining the conference call, the telephone user simultaneously uses the wireless access protocol browser to perform data communication. The user then relays the information accumulated from the data communication back to the conference call.

5 Claims, 7 Drawing Sheets

CONFERENCE CALL SETUP UTILIZING A WIRELESS ACCESS PROTOCOL CAPABLE TELEPHONE

BACKGROUND OF THE INVENTION

I. Field of the Invention

The present invention relates generally to wireless communications. Particularly, the present invention relates to Wireless Access Protocol (WAP) enabled devices.

II. Description of the Related Art

Conference calling, with either landline or wireless telephones, gives users the ability to talk simultaneously. Conference calling obviates the need to make multiple telephone calls to accomplish a task involving multiple people.

The capability of wireless telephones is rapidly increasing. Wireless telephones now have the ability to access the Internet using a microbrowser that is part of the telephone. The microbrowser is a very simple version of person computer browsers such as MICROSOFT'S INTERNET EXPLORER and NETSCAPE'S COMMUNICATOR. This Internet browsing capability is in the process of being standardized through a wireless access protocol (WAP) forum that is setting the rules for communicating in a wireless manner with the Internet.

A language designed for this type of communication is the wireless markup language (WML). This language is an application of Extensible Markup Language (XML). WML was designed for wireless communication devices with small, low-resolution screens that are prevalent on cellular telephones.

Accessing information from the Internet using a wireless telephone enables one to determine entertainment information in the telephone's area as well as the telephone numbers, email addresses, and directions to those establishments. Using this information, the telephone user can send a message to these establishments or carry out electronic commerce transactions online.

In order for a telephone user to set up a meeting to go to the theatre for a movie together, the user must conference call the people in the meeting to get their ideas and agree on the show to watch and theater at which to meet. Then the telephone user must hang up and make a data call to browse the Internet in order to get information for local cinema establishments. The user then either calls these establishments to make reservations or purchases tickets online and then must call back the people involved with the meeting to give them the information. There is a resulting unforeseen need to make a conference call that can include a simultaneous data call to the Internet with a WAP capable telephone.

DETAILED DESCRIPTION OF THE PREFERRED EMBODIMENT

Wireless Access Protocol (WAP) capable cellular telephones are becoming more popular due to the information delivered to the cellular telephone and options available to the user. The WAP capable cellular telephone is comprised of Web browser-type software that enables the cellular telephone user to access information over the Internet in addition to controlling the operation of the telephone.

Using the WAP capabilities of the cellular telephone, the user can set up a conference call with multiple people. The user can also, while the conference call is still going on, make a data call with the browser to retrieve information from the Internet.

The WAP protocol and architecture discussed herein is well known in the art. A further discussion of WAP is available from the WAP forum. Most documents generated by the WAP forum are available over the Internet at www.wapforum.com.

Figure 1:
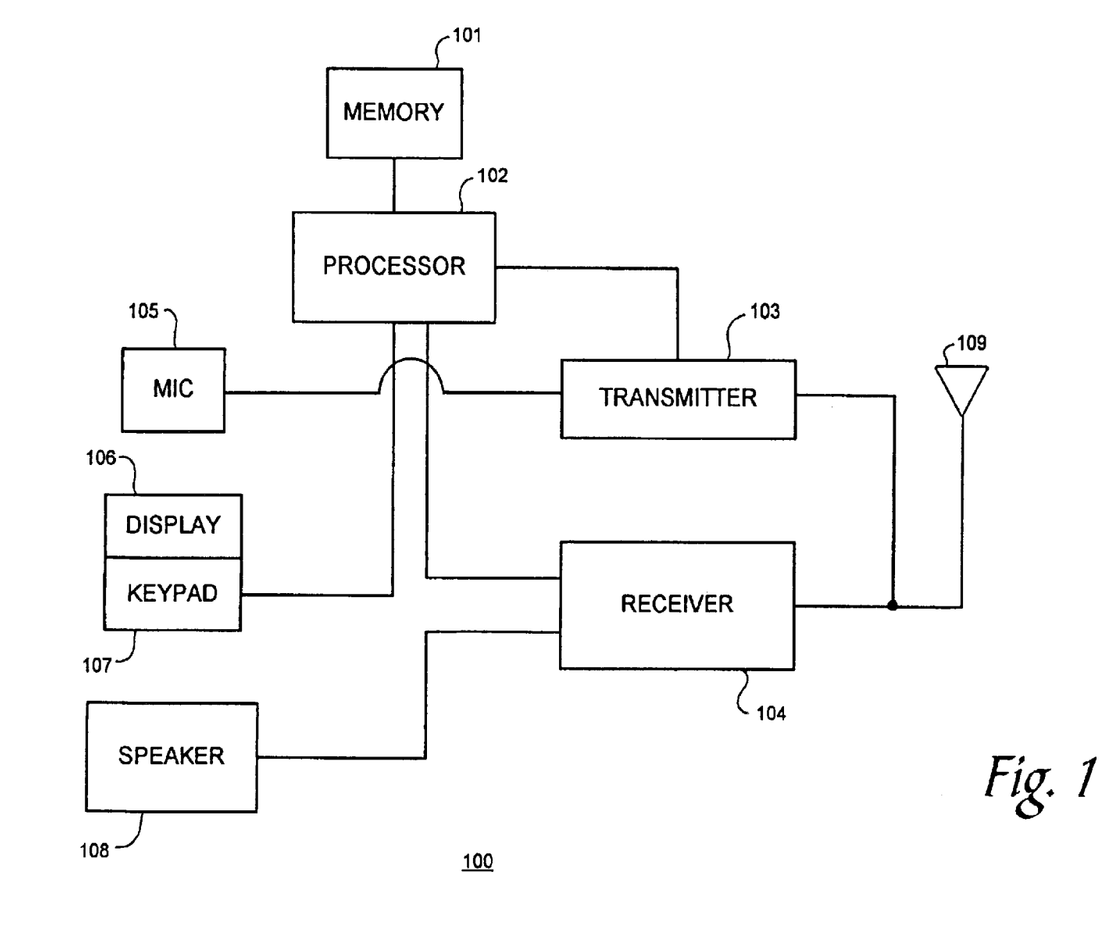
FIG. 1 shows a block diagram of a cellular telephone in accordance with the present invention.

FIG. 1 illustrates a block diagram of a typical WAP capable cellular telephone (100). The telephone (100) is comprised of a microphone (105) for converting a voice signal to an electrical signal for transmission by the transmitter (103) and radiated over the antenna (109). Signals received by the antenna (109) are received and demodulated by the receiver (104) before being converted to an aural signal by the speaker (108). The telephone user inputs information and operates the telephone by the keypad (107). The display (106) shows the user what was input on the keypad (107) as well as information that was received by the receiver (104).

A processor (102) that is coupled to memory (101) controls the cellular telephone (100). The processor scans the keypad (107) for inputs, displays appropriate data on the display (106) and controls the transmission and reception of data.

The processor (102) is also responsible for running any processes used by the telephone. For example, since the telephone is WAP enabled, the processor (102) runs the Web browser-type process that communicates data over the Internet. The Web browser-type process is responsible for sending and retrieving e-mails, accessing Web pages for information, and sending information to a Web site.

The Web browser-type process is a smaller version of the Web browser programs written for personal computers. These include programs such as MICROSOFT INTERNET EXPLORER and NETSCAPE NAVIGATOR. The Web browser-type process for the WAP capable telephone is required to be smaller in size in order to fit in the memory of the telephone. This browser-type process also must download and render Web pages for a substantially smaller screen on the telephone than that used in a typical personal computer. This Web browser-type process is well known in the art and is not discussed further herein.

While the preferred embodiment of the present invention is described as using the WAP capable cellular telephone (100) of FIG. 1, other types of WAP capable wireless communication devices also operate effectively with the process of the present invention. As an example, in an alternate embodiment, a WAP capable personal digital assistant (PDA) that operates in a wireless fashion can be substituted for the cellular telephone.

Figure 2:
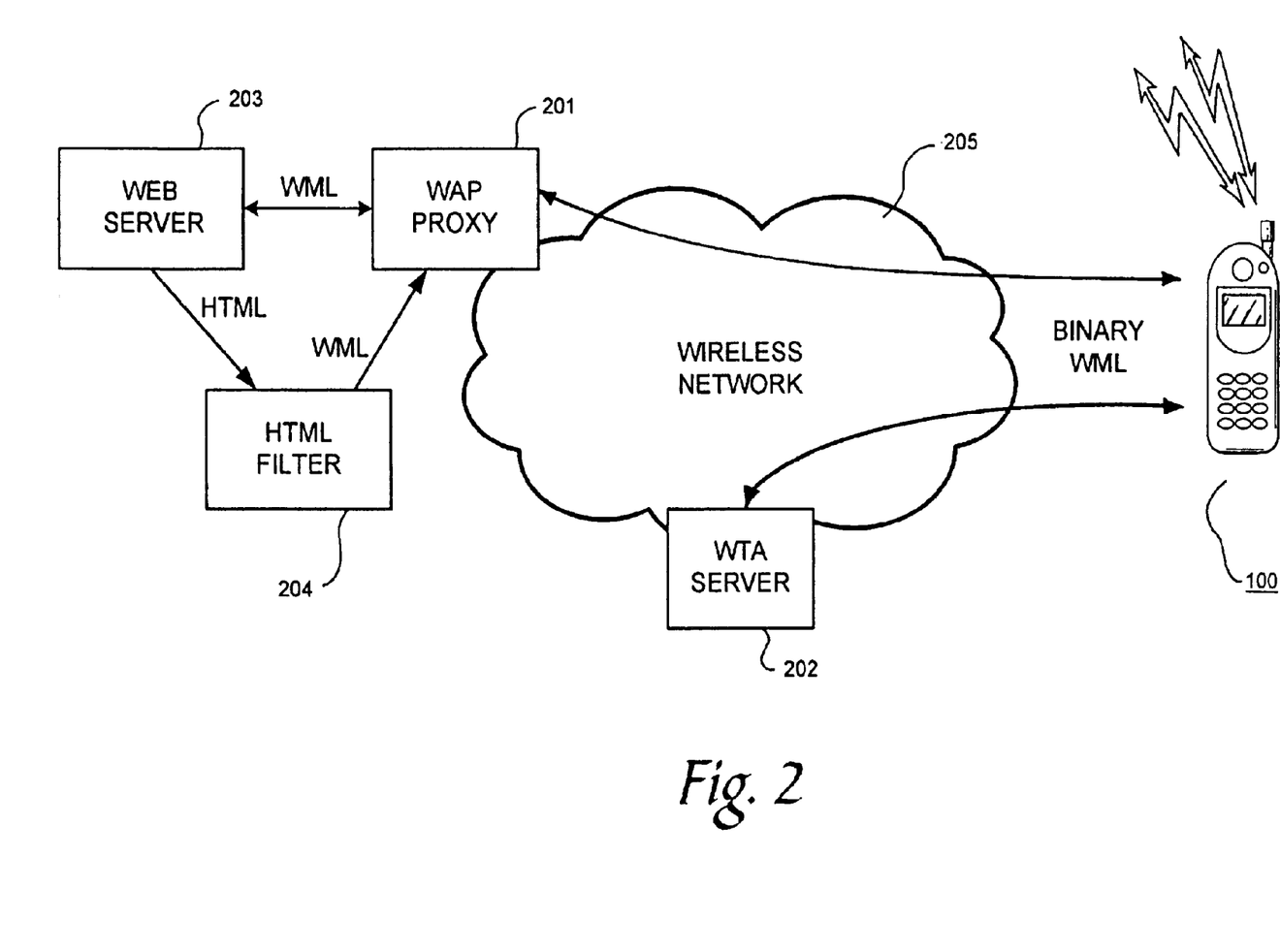
FIG. 2 shows a block diagram of a Wireless Access Protocol (WAP) system using a WAP capable cellular telephone.
Figure 3:
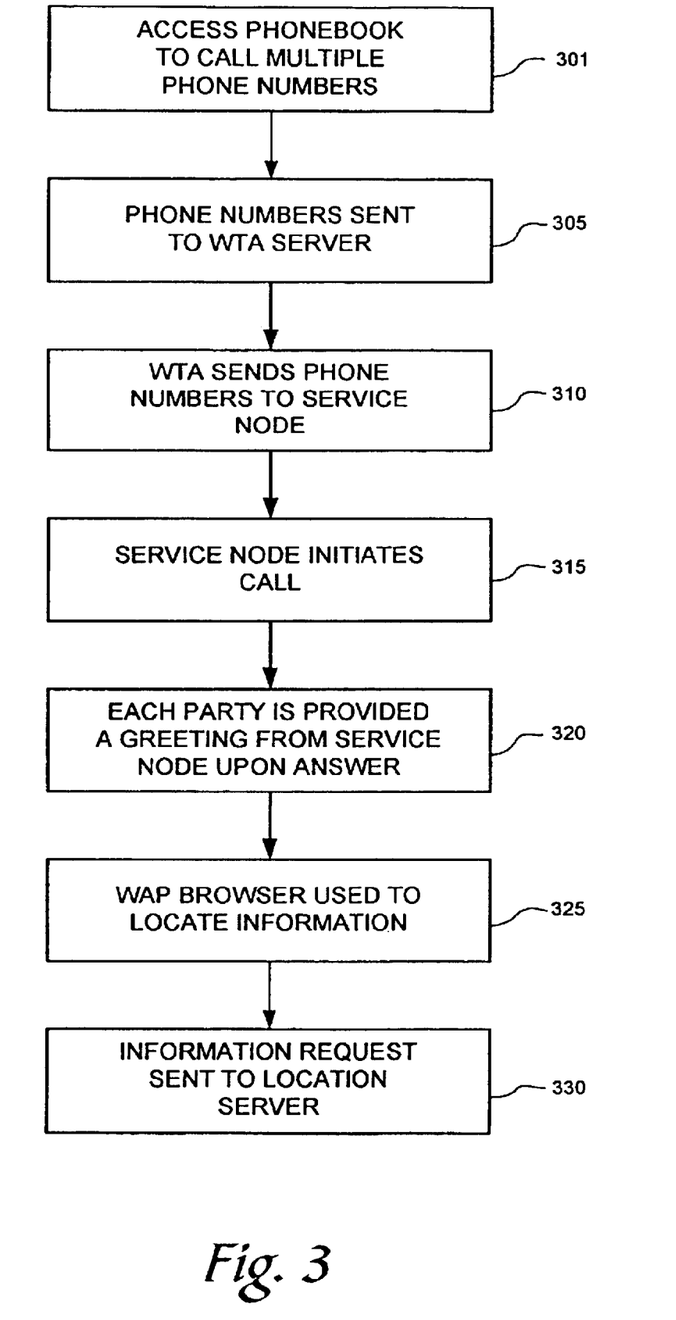
FIG. 3 shows a flowchart for a conference call setup process in accordance with the present invention.

FIG. 2 illustrates a block diagram of a WAP network of the present invention. This network is comprised of the WAP capable cellular telephone (100) illustrated in FIG. 1. The cellular telephone (100) communicates with the wireless cellular network (205). The network (205) is comprised of a large number of fixed antennas coupled to low power transmitters. Each antenna radiates into a segmented (depending on the number of directional antennas employed) 360 area. Examples of such networks are the AMPS cellular network and the CDMA PCS networks. The cellular network of the present invention is well known in the art and will not be discussed further.

The wireless network (205) allows the telephone (100) to communicate with a WAP gateway proxy (201). As is well known in the art, a proxy is an intermediary program that acts as both a server and a client for the purpose of making requests on behalf of other clients, such as the telephone (100) in the present embodiment. The proxy typically resides between clients and servers that have no means of direct communication (e.g., across a firewall). Requests are either serviced by the proxy program or passed on, with possible translation, to other servers.

In the present embodiment, the WAP proxy (201) translates the WAP requests from the telephone (100) to the protocol used by the World Wide Web. This allows the telephone (100) to submit requests for information to the Web server (203). The proxy (201) also encodes the response from the Web server (203) into the compact binary format understood by the telephone (100).

WAP capable devices access web servers that communicate using HTTP in order to render WML and WMLscript content to the devices. WML is an application of XML. WML is required due to the reduced capabilities of the WAP capable wireless devices as well as the constraints imposed by the low bandwidth wireless networks as compared to a personal computer with substantially more memory and processing power and accessing the Internet over higher speed connections.

If the Web server (203) provides WAP content, the WAP proxy (201) retrieves it directly from the Web server (203). However, if the Web server (203) provides WWW content (such as HTML), an HTML filter (204) is used to translate the WWW content into the WAP content. For example, the HTML filter (204) would translate HTML into WML. The telephone (100) then accesses the WWW content from the WAP proxy (201).

The Web server (203) stores the information and Web pages that are accessed by both WAP devices and typical personal computers over the Internet. For purposes of clarity, only one Web server (203) is shown in FIG. 2. In reality, depending on the information required by the telephone (100), multiple Web servers are needed. Each Web server may reside at a different site and be operated by a different company. While the preferred embodiment illustrates the WAP proxy (201) and Web server (203) as being separate entities, alternate embodiments include a WAP gateway function as part of the Web origin server serving the content.

A Wireless Telephony Application (WTA) (202) server is a special kind of origin server that communicates with the WAP telephone (100) directly. The WTA server (202), therefore, operates in the WML format. The WTA server (202) provides WAP access to features of the wireless network provider's telecommunications infrastructure. For example, the network provider may provide storage of telephone numbers and addresses for the telephone user. The user can then access these numbers through the WTA server (202) using the telephone's browser.

As an example of the operation of the present invention, the telephone user, John, sets up a conference call using his telephone number book stored in the memory of the mobile client or cellular telephone. In this embodiment, John calls his family, Jane and Ralph, regarding the movie they would like to see and type of restaurant they would like to visit for dinner.

In order to do this, John keys in the first name of the person that he would like to call, in this case Jane. The client application then asks if there are any other names to be called. John then inputs either an affirmative answer or just searches for Ralph's telephone number from the stored telephone numbers in the mobile.

Figure 4:
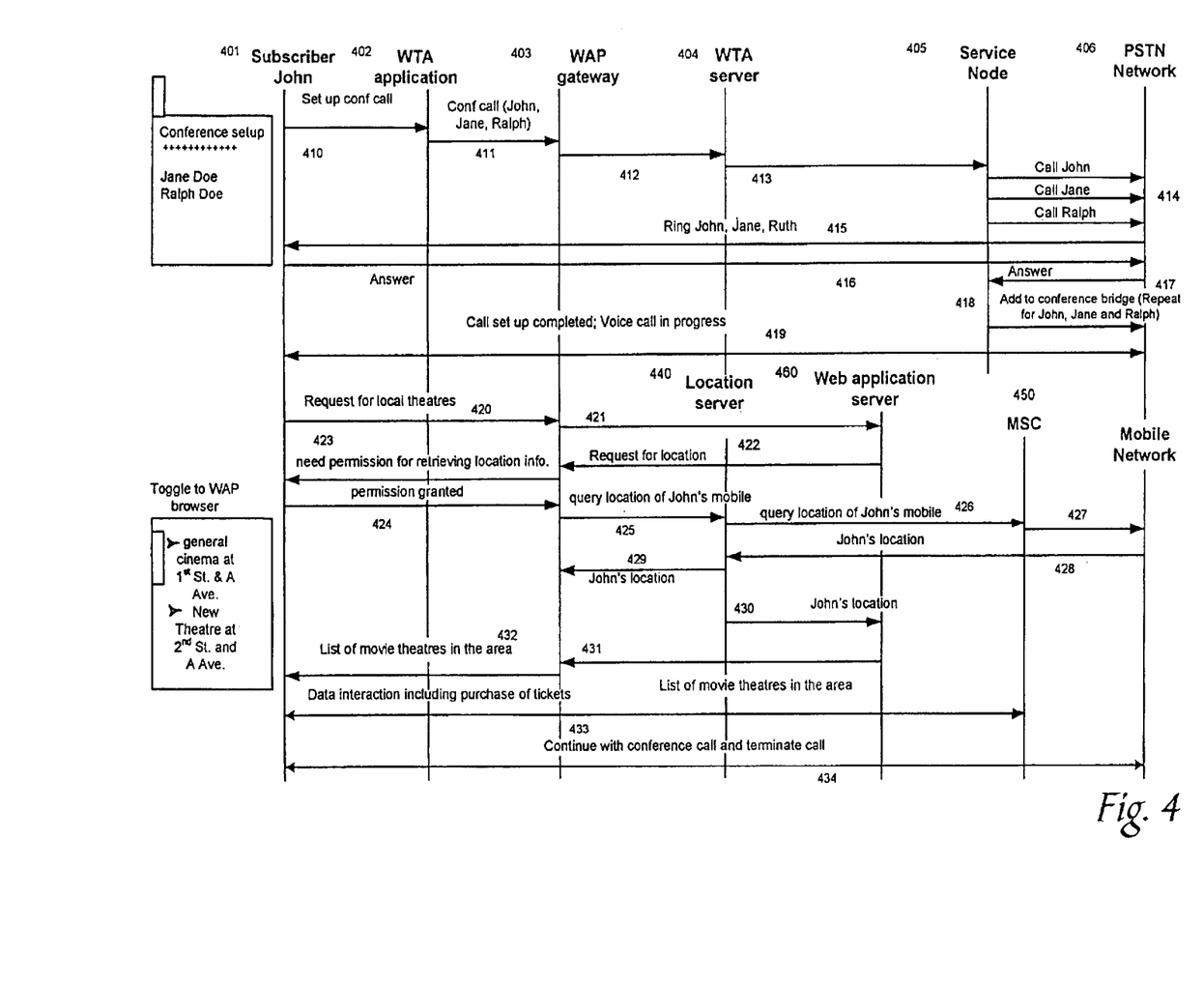
FIG. 4 shows a signaling diagram of the conference call setup process in accordance with the present invention.

When John is done entering telephone numbers, he conveys this to the cellular telephone by depressing the enter key or the end key. The cellular telephone then sends the telephone numbers to the WTA server. Signaling is then performed, as illustrated in FIG. 4 and will be discussed later, that sets up the conference call between John, Jane, and Ralph.

While still maintaining the conference call, John uses his WAP browser to locate the closest movie theaters over the Internet. This requires the cellular telephone to make a data call to a web server at the same time as the voice call. It should be noted that a "data call" may not have to be explicitly "made" in a packet network. The session could be always on. In that case, the user simply makes a data "request" to a web server for information.

For the purposes of receiving information that is specific to the area in which John is located, the location of the cellular telephone must be determined using techniques that are well known in the art. In one embodiment, the mobile network uses triangulation with cell transmission towers to determine the cellular telephone's location. In this embodiment, the time delay of signals from the cellular telephone to three different cell transmission towers provides a relatively accurate location of the telephone.

Another embodiment uses global positioning satellites (GPS) to determine the cellular telephone's location. In this embodiment, a GPS receiver is embedded in the telephone to accurately determine its location. Implementations include network assisted GPS or handset (mobile) based GPS.

Depending upon the whether it is network assisted GPS or not, the location information may or may not be forwarded to the mobile network. If it is network assisted, then the raw location info sent by the phone has to be processed by the network before it is forwarded on to the server.

Now that the location of the cellular telephone is known, when John accesses the web server to find the nearest theaters through the browser, the location information is sent to the origin server that responds with information about all establishments within a predetermined radius from the cellular telephone. This radius can be chosen by John when making the request or as a stored preference in the cellular telephone or in a user profile database on the Internet.

John now has information on each local theater in the area, popular movies playing in those establishments, and he can even purchase tickets online, while Jane and Ralph are on the call (voice) and know what is happening. This saves John or Jane/Ralph from making another call to update each other on the plans, and is convenient, as they don't need to stand in a waiting line to purchase tickets at the theaters.

FIG. 4 illustrates the signaling performed by the telephone and the network using the conferencing call setup process of the present invention. The signaling is performed by and between the subscriber (401) using the browser, the WTA application (402) on the mobile client, the WAP gateway or proxy (403), the WTA server (404), the service node (405), and the mobile network (406). In this scenario, it is possible that Jane and Ralph are using wired telephone in which case 406 would be PSTN.

FIG. 2 and its associated discussion illustrate most of the above entities (401–406) associated with the signaling process of FIG. 4. The service node is an intelligent network element that provides service logic control of telecommunication network resources, such as voice and announcement circuits. In this embodiment, it is responsible for providing the circuit bridge for the multiparty conference call and playing associated announcements.

The mobile network (406) is the network in which the subscriber (mobile client) is operating. The subscriber starts the process when John uses his WAP browser to access his telephone book stored in the cellular telephone. He selects Jane and Ralph's phone numbers. These numbers are communicated (410) to the WTA application. The WTA application sends the numbers (411) to the WAP gateway that forwards (412) them to the WTA server.

In another embodiment, the phone book could be a network-based directory, such as white pages or lightweight directory access protocol server (LDAP), in which case John accesses the phone numbers over a WAP data session in order to setup the conference call.

The WTA server interfaces with the intelligent network and sends (413) the phone numbers to the service node. The service node then initiates the calls (414) to John, Jane, and Ralph. The mobile network then provides the ringing or other alert to John, and depending upon the connection to Jane, and Ralph, the PSTN would provide the ringing to their fixed (wired) telephones (415).

In the preferred embodiment, the alert is a tone or ringing sound. Alternate embodiments use vibration to alert the cellular telephone user as to the incoming call.

At this point, as each person answers the call (416), the mobile network instructs (417) the service node that a particular call has been answered. This is repeated for each of the people being alerted to the conference call (418).

In the preferred embodiment, the service node provides a greeting to each participant to the conference call that they are being called for the purpose of a conference call. For example, the service node may have a computer-generated voice that states, "You are being conferenced by John, please hold while the remaining parties join the bridge." When the final conference call party has responded, the call is signaled as being complete (419).

If one of the participants to the conference call does not respond to the alert, a predetermined time is set when the service node stops attempting to contact that individual. In the preferred embodiment, the predetermined time is 5 rings. However, this may be set to a specified length of time or a different number of rings.

If one or more of the participants does not respond, the service node informs the remaining participants that that individual did not respond. In the alternative, the service node may only inform the conference call initiator regarding which individual did not respond.

In an alternative embodiment, John and Jane have WAP enabled telephones and are reachable in the mobile environment. In this case, it is possible for the notification of conference call to arrive in the form of a WAP Push message.

After the conference call has been set up, the subscriber John uses his WAP browser to retrieve the closest movie theatres relative to his current location. This request is sent (420) via the WAP gateway to the web application server (421) that will handle the request. In doing so, the location information may or may not be implicitly sent along with the request. This is due to privacy issues associated with transmitting location information.

If the position of the mobile telephone is not included in the request to the origin server, the server makes an explicit request (422) for the information. Intone embodiment, the request for the retrieval of the position information from the network is passed on to the client for user's approval. In this case, the WAP proxy forwards the request for location information to the subscriber (423).

An alternate embodiment would support the proxy looking up the subscriber in a subscription or privacy database for prior approval, in order to enable retrieval of such information (in which case 423 is not needed). In a third embodiment, the original request does not even reach the web application server in the first place until the proxy has the location information already appended to the original request (in this case, the request first reaches the proxy, which retrieves the position information from the location server on behalf of the subscriber, and upon receiving this information, appends it to the request and only then sends it to the web server for processing).

Figure 7:
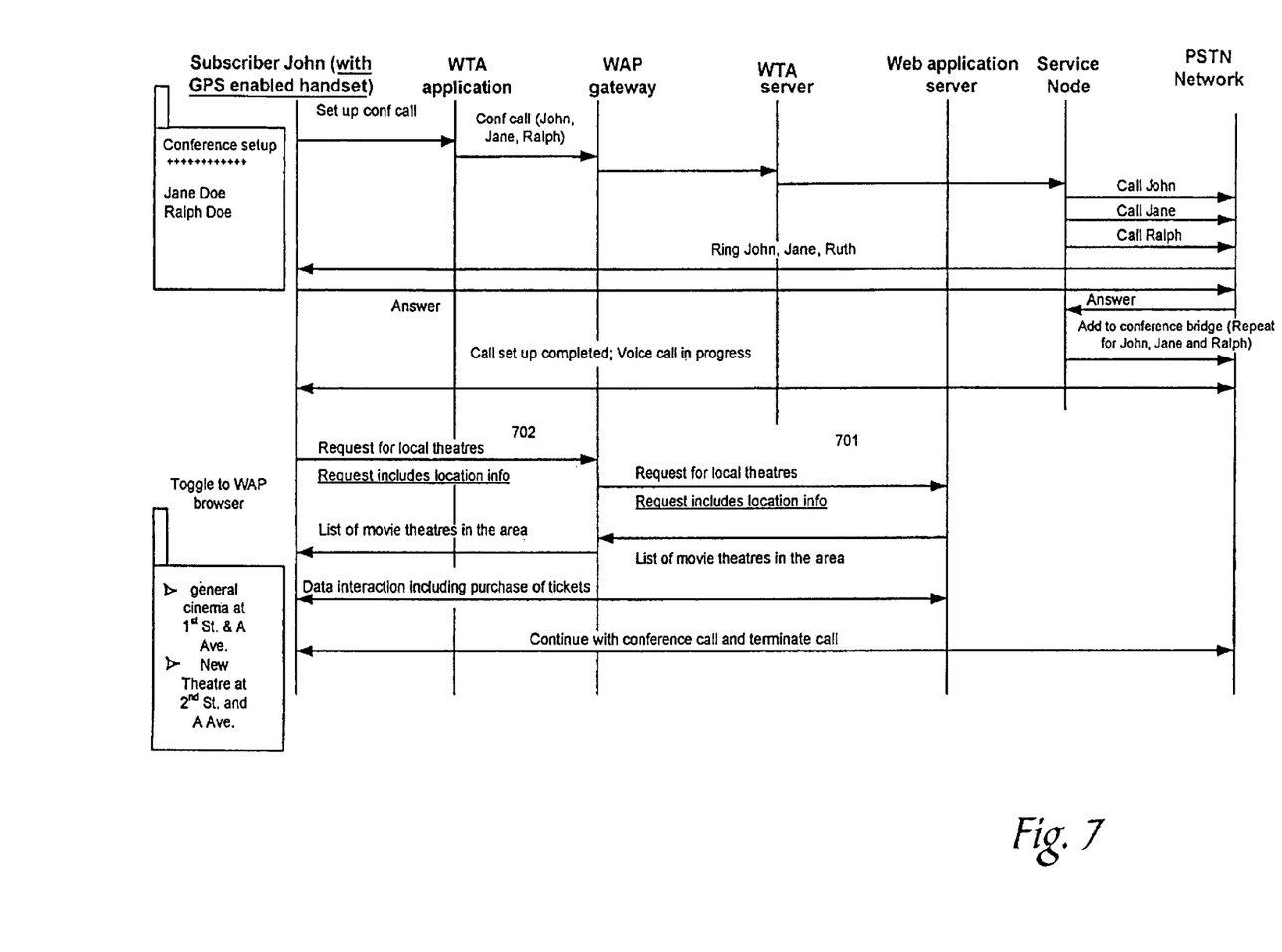
FIG. 7 shows a signaling diagram of yet another alternate embodiment conference call setup process in accordance with the present invention.

In yet another embodiment, if the handset is GPS enabled, the position information is included in the original request (header or body) to the web server by means of WAP User Agent Profiles and Composite Capabilities/Preferences Profile or similar means. In this case, there is no need to use the location server in the mobile network as illustrated in the embodiment of FIG. 7. The subscriber agrees (424), via the WAP interface, for the location information to be retrieved (425–428) and forwarded (429) on to the Web server.

The location server (440) is a specialized server that can retrieve from the mobile network, the location of each subscriber of that network. Depending upon the capabilities implemented in this entity, it could also map the position information received from the mobile network into a form that is understood by the web server. The location server may interface with the WAP proxy via HTTP or other protocols. Depending upon implementations as a mobile positioning center (MPC) or mobile location center (MLC), it may also interface with the base station and the HLR in the mobile network.

Upon receiving a request from the WAP proxy for retrieval of position information, the location server requests the location from the mobile switching center (MSC) (450) that services that mobile network area. MSC's are well known in the cellular telephone art. The MSC is responsible for routing telephone calls from the public switched telephone network to appropriate cells within a cellular telephone network. The MSC also routes the incoming calls from the cells to the public switched telephone network.

The MSC forwards the request (427) for the location information for John's mobile to the mobile network. The mobile network responds with (428) the position information back to the location server (440), which then sends it along (429) to the WAP gateway proxy as a response to the query. The WAP proxy, having received John's location information, sends it on (430) to the web application server (460).

The web server (460) now has the information it needs to process John's request (420 and 421). It returns to the WAP gateway, (403) information about theaters (431) local to the mobile (401). The WAP gateway (403) encodes this information (432) and renders it to the browser on John's mobile (401).

John (401) interacts (433) with the web server via the WAP gateway to determine the movie of choice, taking into account the preferences of Jane and Ralph through the conference call (419), and then purchases the tickets for all of them online. He then goes back to his conference call (434) with Jane and Ralph, agreeing to meet them at the theatre at a specified time, and terminates the call.

Figure 6:
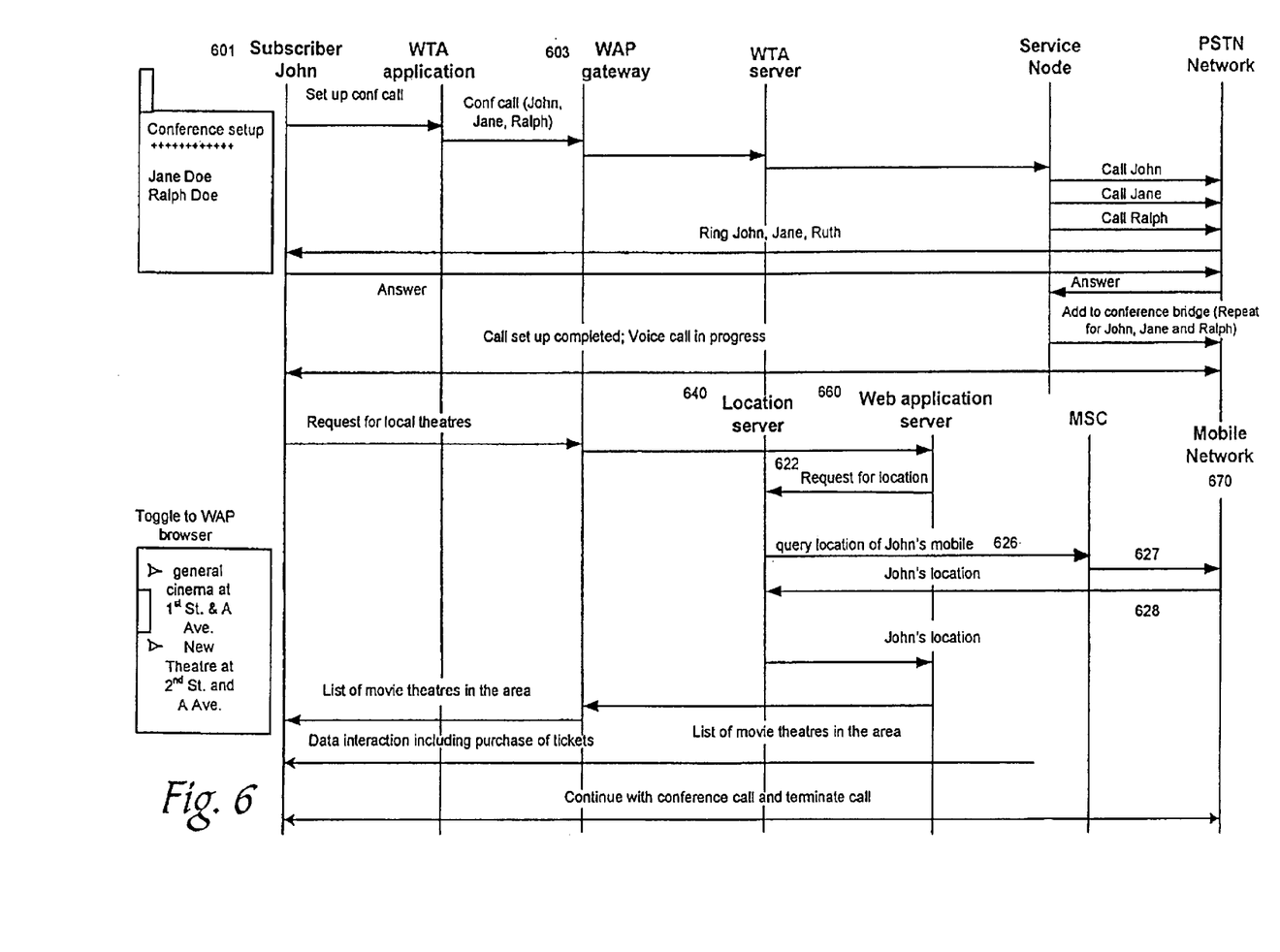
FIG. 6 shows a signaling diagram of an alternate embodiment conference call setup process in accordance with the present invention.

In another embodiment, illustrated in FIG. 6, the location server (640) interfaces directly with the web server (660) instead of, or in addition to, the WAP proxy (603). In this case, the subscriber's identification is sent along with the request for local movie information.

Assuming that John has subscribed to location based services, and has given prior approval for retrieval of location information at the web application server (660), the web application server (660) originates a query request (622) to the location server (640) for determining John's location. In this embodiment, the location server (640) proceeds as in the example of FIG. 4 to determine (626–628) from the mobile network (670) the position of John's mobile phone (601), and then directly sends this information back to the location server (640).

FIG. 7 illustrates yet another embodiment of the present invention. In this embodiment, the mobile phone is GPS-enabled so that the location server is no longer necessary. This call flow diagram performs the same result as the preferred embodiment without the location server.

The call flow of FIG. 7 is substantially similar to the call flow of FIG. 4 without the queries to the location server for location information. Therefore, when the mobile phone queries (702) the WAP gateway for the local theaters and the query is forwarded (701) to the web application server, the location information from the mobile phone is included in the query.

In a preferred embodiment, the telephone numbers for the conference call are stored in the telephone's memory. Alternate embodiments retrieve the telephone numbers from the wireless telephony application server where a file on the telephone user is stored, or from a network based address book such as LDAP or Internet White Pages.

Figure 5:
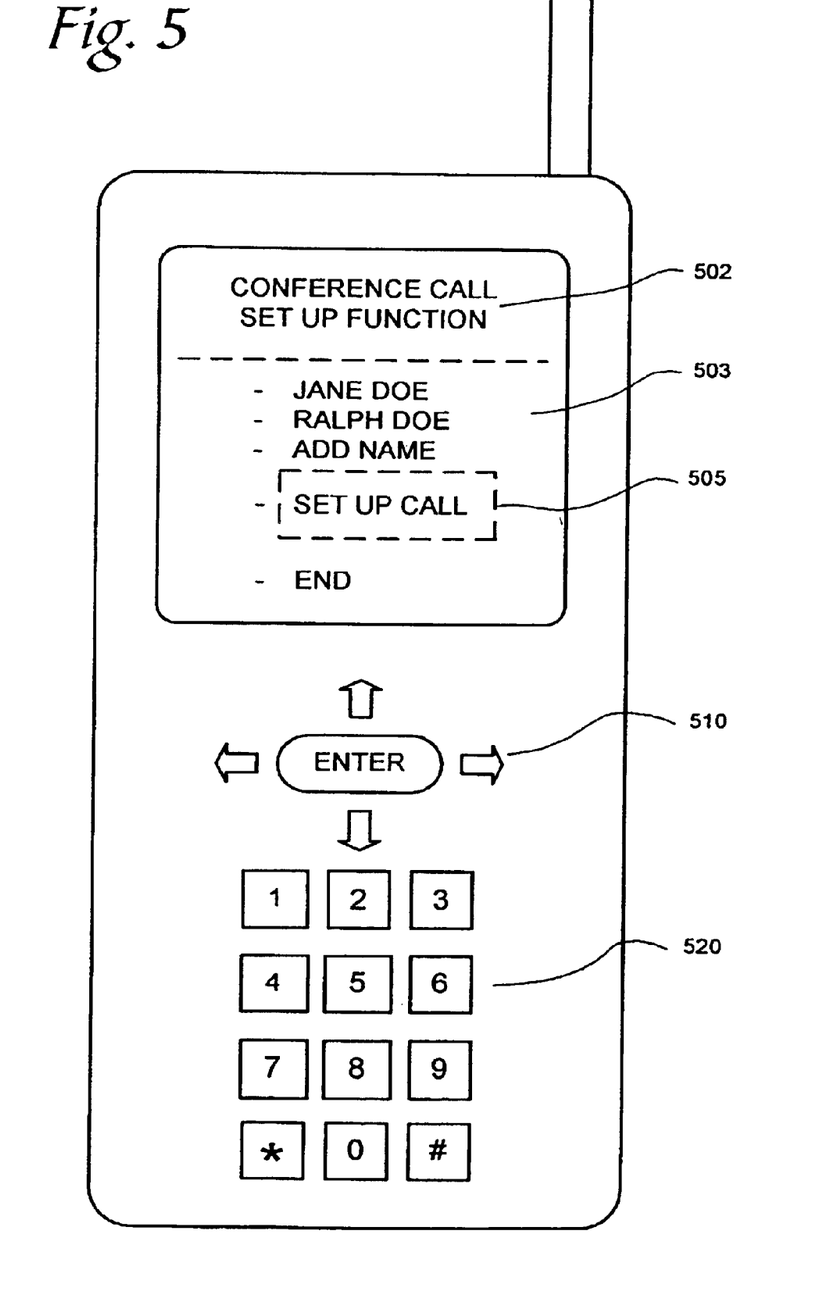
FIG. 5 shows a wireless access protocol capable cellular telephone having a display in accordance with the conference call setup of the present invention.

FIG. 5 shows a telephone having a display in accordance with the process of the present invention for giving the telephone user options on setting up a conference call. When the user accesses the conference call function, the display shown in FIG. 5 automatically comes up. The top portion (502) displays the function currently available to the telephone user. Depending on the WAP browser and the telephone, there are many different functions that the telephone user can call up.

The bottom portion (503) of the display shows the names and/or the telephone numbers of the people to be added to the conference call. The names of Jane and Ralph Doe are shown for illustration purposes only. The display may show more or less names depending on the embodiment.

Alternate embodiments may divide up the display differently. For example, one embodiment may have the telephone or WAP function located at the bottom of the screen and the other information at the top. Different size and style displays than that pictured in FIG. 5 will have different orientations than that discussed.

The cursor (505) is positioned over one of the name locations. In the preferred embodiment, "ADD NAME" is located in all three slots of the display. The user, by placing the cursor (505) over that slot, can add a name to it and replace the "ADD NAME" wording with the name of the person to be added to the conference call. Alternate embodiments have the cursor start at other locations.

FIG. 5 shows the cursor (505) as being a dotted or dashed line around the option. Another embodiment uses an inverse video display over each option that the cursor covers. Another alternate embodiment uses an arrow next to each option as the cursor.

The telephone user can move the cursor (505) down through the options using the arrow keys (510). Once the cursor is positioned over the desired call disposition option, the enter key is depressed to activate this option. In an alternate embodiment, instead of depressing the "enter" key, the telephone waits a predetermined time and then activates the option over which the cursor (505) is positioned.

In yet another alternate embodiment, if the options (503) are numbered, the telephone user can enter the number of the desired option using the telephone's keypad (520).

Upon entering the desired option, the display changes to indicate which option was selected and that the option is being processed. For example, when the cursor is positioned over the first "ADD NAME" slot and the "enter" key is depressed, another screen (not shown) for the user's telephone number book is depicted to allow the user to position the cursor over a certain name. Once the name is highlighted with the cursor, the "enter" key is depressed again and that name is added to the list of names to be called for the conference call.

This process is repeated until all names have been added and the cursor is positioned over the "SET UP CALL" label and the enter key is depressed. These names and associated telephone numbers are then handled as described above in FIG. 4.

Since the present invention operates with other communication devices that are WAP capable, these other communication devices will appear differently than the telephone illustrated in FIG. 5. For example, if a WAP capable PDA uses the incoming call process of the present invention, the keypad and arrow keys may not be needed. The PDA may substitute a touch screen display for the keypad and arrow keys.

In the preferred embodiment, the voice connection between the telephone numbers is circuit switched. Alternate embodiments use a packet switched connection. The connection may also be done over the Internet.

The present invention will work with more then just audio calls. If a connection having a high enough bandwidth is possible, video calls may also be conference using the present invention.

In summary, the present invention provides process for a mobile, WAP capable telephone to set up a conference call in addition to a data call. The telephone user can select multiple individuals from the telephone's stored directory for adding to the conference bridge. Once the call is complete, a data call can be done while the conference call is still connected.

We claim:

1. A method for conferencing a plurality of telephone numbers onto a single telephone call using a wireless access protocol-capable telephone, the method comprising the steps of:

selecting, at the wireless access protocol-capable telephone, a plurality of participants corresponding to the plurality of telephone numbers;

accessing the plurality of stored telephone numbers;

transmitting the plurality of stored telephone numbers to a server;

the server transmitting the telephone numbers to a service node;

initiating a telephone call in response to each of the plurality of telephone numbers;

conferencing all answered telephone calls on to a conference bridge; and performing a data session simultaneously with the operation of the conference bridge;

determining a location for the wireless access protocol-capable telephone;

transmitting the location to a web application server;

the web application server transmitting contextualized content to the wireless access protocol-capable telephone based on the location; and performing electronic commerce transactions as a result of the web interaction.

2. The method of claim 1 wherein the step of determining a location for the wireless access protocol-capable telephone is accomplished using triangulation.

3. The method of claim 1 wherein the step of determining a location for the wireless access protocol-capable telephone is accomplished using global positioning satellites.

4. The method of claim 1 wherein the step of determining a location for the wireless access protocol-capable telephone is accomplished from a GPS enabled mobile by means of a network assisted GPS.

5. A network for providing the ability for conferencing a plurality of telephone numbers onto a single telephone call simultaneous with a data call, the network communicating with a wireless access protocol-capable telephone having a wireless access protocol browser, the network comprising:

a wireless access protocol gateway for receiving the plurality of telephone numbers and forwarding the plurality of telephone numbers;

a wireless telephony application server for receiving the forwarded plurality of telephone numbers and forwarding call information for each telephone number;

a service node for receiving the forwarded call information and initiating a telephone call in response to each of the call information;

a location server for retrieving a location of the wireless access protocol-capable telephone;

a web application server that can process a data call request based on location information and render web content, comprising electronic commerce transactions, back to the wireless access protocol browser; and a mobile network for interfacing between the service node and the wireless access protocol-capable telephone to generate the ringing signals to each telephone number and receive an answer back from each telephone associated with each telephone number, the mobile network further setting up a conference bridge between each answered telephone number and enabling the data call with the wireless access protocol-capable telephone simultaneously with the conference bridge operation such that access to location based information and services are enabled from the wireless access protocol-capable telephone.

* * * * *